United States Patent
Arai

(10) Patent No.: US 7,826,648 B2
(45) Date of Patent: Nov. 2, 2010

(54) IMAGE PROCESSING APPARATUS WHICH PROCESSES AN IMAGE OBTAINED BY CAPTURING A COLORED LIGHT-TRANSMISSIVE SAMPLE

(75) Inventor: Satoshi Arai, Hachioji (JP)

(73) Assignee: Olympus Corporation, Tokyo (JP)

( * ) Notice: Subject to any disclaimer, the term of this patent is extended or adjusted under 35 U.S.C. 154(b) by 1005 days.

(21) Appl. No.: 11/590,978

(22) Filed: Nov. 1, 2006

(65) Prior Publication Data

US 2007/0047804 A1    Mar. 1, 2007

Related U.S. Application Data

(63) Continuation of application No. PCT/JP2005/009026, filed on May 18, 2005.

(30) Foreign Application Priority Data

May 20, 2004   (JP) ............................. 2004-150534

(51) Int. Cl.
  *G06K 9/00* (2006.01)
  *G01J 3/46* (2006.01)
  *G01B 9/02* (2006.01)
(52) U.S. Cl. .................. 382/128; 356/402; 356/456
(58) Field of Classification Search ......... 382/128–134, 382/162–166, 260–265, 276, 307; 600/334, 600/358, 442; 356/402, 406, 456; 250/578.1; 701/28; 702/179, 190
  See application file for complete search history.

(56) References Cited

U.S. PATENT DOCUMENTS

| 5,477,334 | A | * | 12/1995 | Keswani et al. ............. 356/405 |
| 5,717,605 | A | * | 2/1998 | Komiya et al. .............. 356/406 |
| 5,784,162 | A | * | 7/1998 | Cabib et al. ................. 356/456 |
| 5,939,278 | A | * | 8/1999 | Boon et al. ................. 435/7.23 |
| 6,300,612 | B1 | * | 10/2001 | Yu .......................... 250/208.1 |
| 6,936,412 | B2 | * | 8/2005 | Abe .......................... 430/387 |
| 7,133,547 | B2 | * | 11/2006 | Marcelpoil et al. .......... 382/129 |

FOREIGN PATENT DOCUMENTS

| JP | 6-96706 A | 4/1994 |
| JP | 6-314338 A | 11/1994 |
| JP | 11-515097 A | 12/1999 |

(Continued)

OTHER PUBLICATIONS

Notification Concerning Transmittal of International Preliminary Report on Patentability, Chapter I of the Patent Cooperation Treaty, and Written Opinion of the International Searching Authority, dated Nov. 30, 2006, for PCT/JP2005/009026, 5 sheets.

(Continued)

*Primary Examiner*—Abolfazl Tabatabai
(74) *Attorney, Agent, or Firm*—Holtz, Holtz, Goodman & Chick, PC

(57) ABSTRACT

An image processing apparatus comprises a dye amount distribution obtaining section configured to obtain a distribution of dye amounts from a sample colored with a dye. The apparatus further comprises a classification section configured to classify a point on the sample in accordance with a dye amount at a corresponding position on the distribution obtained by the dye amount distribution obtaining section.

9 Claims, 7 Drawing Sheets

FOREIGN PATENT DOCUMENTS

| | | |
|---|---|---|
| JP | 2000-501829 A | 2/2000 |
| JP | 2001-059842 A | 3/2001 |
| JP | 2002-521682 A | 7/2002 |
| JP | 2003-65948 A | 3/2003 |

OTHER PUBLICATIONS

Y. Murakami et al; Spectral Reflectance Estimation From Multi-Band Image Using Color Chart; Optics Communications; Feb. 1, 2001; pp. 48-54.

K. Fujii et al; Analysis of Tissue Samples Using Transmittance Spectra—The Method of Considering the Differences of Dyeing Conditions; $3^{rd}$ Symposium of the "color" of Digital Capturing in Biomedicine. (English translation attached).

T. Moriya; The Institute of Electronics, Information and Communication Engineers, 1998, English Translation Attached "An Algorithm for Vector Quantizer Design".

Japanese Office Action dated Sep. 7, 2010 and English translation thereof, issued in counterpart Japanese Application No. 2004-150534.

* cited by examiner

IMAGE PROCESSING APPARATUS WHICH PROCESSES AN IMAGE OBTAINED BY CAPTURING A COLORED LIGHT-TRANSMISSIVE SAMPLE

CROSS REFERENCE TO RELATED APPLICATIONS

This is a Continuation Application of PCT Application No. PCT/JP2005/009026, filed May 18, 2005, which was published under PCT Article 21(2) in Japanese.

This application is based upon and claims the benefit of priority from prior Japanese Patent Application No. 2004-150534, filed May 20, 2004, the entire contents of which are incorporated herein by reference.

BACKGROUND OF THE INVENTION

1. Field of the Invention

The present invention relates to an image processing apparatus which processes an image obtained by capturing a colored light-transmissive sample, and particularly to classification of tissues included in a body tissue sample.

2. Description of the Related Art

Various attempts have been made up to now to classify tissues included in a dyed biopsy sample.

For example, a pathological image inspection support apparatus disclosed in Jpn. Pat. Appln. Publication No. 6-96706 captures an image of a tissue sample after applying a special staining procedure to the tissue sample, and extracts portions which are positive to the special staining procedure and nuclei based on the color information of respective pixels. Further, for example, appearance frequency of derangement cell hyperplastic focuses is analyzed using a result of extracting the portions positive to the special staining procedure. Another result of extracting nuclei is further subjected to morphological analysis, to support recognition of a normal portion and a cancerous portion.

Meanwhile, a pathological diagnosis apparatus disclosed in Jpn. Pat. Appln. Publication No. 2001-59842 captures an image of a hematoxylin-eosin-stained pathological sample, and classifies nuclei and cavities (regions including neither nucleus nor cytoplasm). Statistical and morphological analyses are carried out with respect to nuclei and cavities, to obtain characteristic values suitable for supporting pathological diagnoses.

BRIEF SUMMARY OF THE INVENTION

According to an aspect of the present invention, there is provided an image processing apparatus comprising:

a dye amount distribution obtaining section configured to obtain a distribution of dye amounts from a sample colored with a dye; and a classification section configured to classify a point on the sample in accordance with a dye amount at a corresponding position on the distribution obtained by the dye amount distribution obtaining section.

Advantages of the invention will be set forth in the description which follows, and in part will be obvious from the description, or may be learned by practice of the invention.

Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A preferred embodiment of the present invention will be described below with reference to the accompanying drawings.

Figure 1:
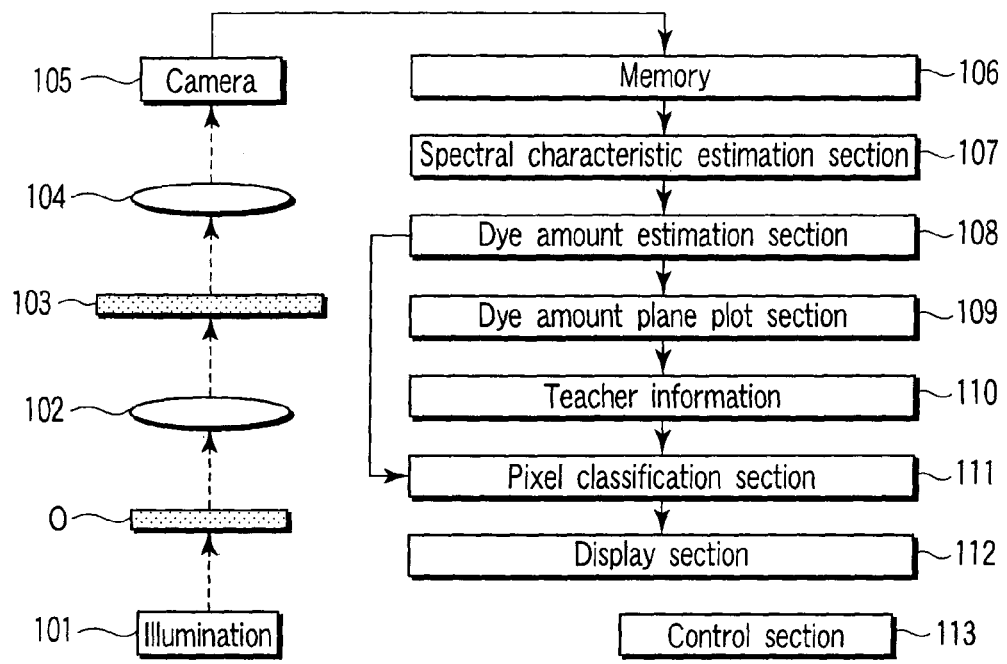
FIG. 1 shows a structure of an image processing apparatus according to an embodiment of the present invention.

An image processing apparatus according to the present embodiment, as shown in FIG. 1, includes an illumination 101, an objective optical system 102, optical filters 103, an optical image forming system 104, a camera 105, a memory 106, a spectral characteristic estimation section 107, a dye amount estimation section 108, a dye amount plane plot section 109, teacher information 110, a pixel classification section 111, a display section 112, and a control section 113. However, connections from the control section 113 to respective portions of the apparatus are not shown in the figure.

Figure 2:
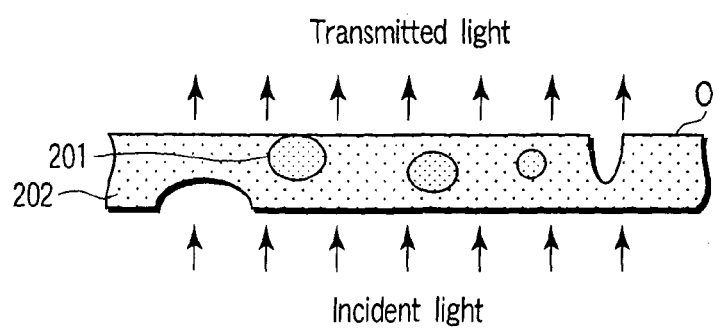
FIG. 2 shows a section of a dyed tissue sample.

Specifically, an object O to be image captured, which is set on a stage not shown, is illuminated with the illumination 101 from the opposite side to the camera 105, as shown in FIG. 2.

Figure 3A:
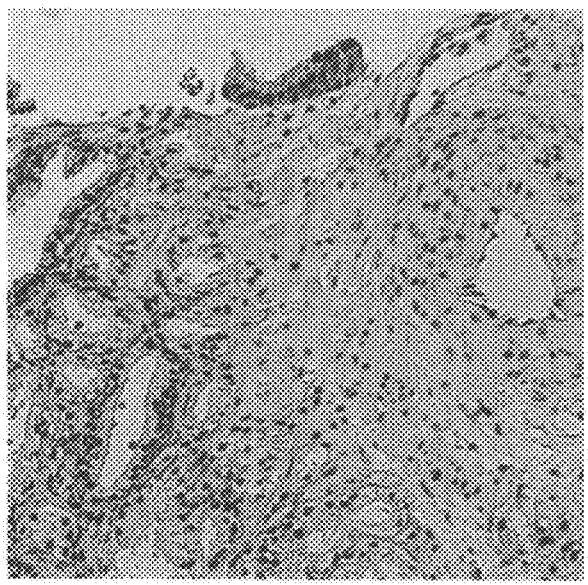
FIG. 3A shows an image of a pathological sample of a prostate gland dyed with hematoxylin and eosin.

In the present embodiment, the object O to be image captured is a pathological sample of a prostate gland dyed with hematoxylin and eosin. Portions 201 dyed with hematoxylin are mainly nuclei. Portions 202 dyed with eosin are mainly cytoplasms. An image of a pathological sample thus dyed with hematoxylin and eosin and captured with an ordinary camera is, for example, as shown in FIG. 3A.

In the present embodiment, an object thus dyed with dyes is imaged over plural bands. Dye amounts in respective pixels are quantitatively estimated and classified into at least a certain number of classes, the certain number being defined by adding 1 to the number of dyes. That is, in the pathological sample of a prostate gland dyed with hematoxylin and eosin, the number of dyes and the number of bands each are two. The respective pixels are classified into four classes. The dyeing procedure with hematoxylin and eosin is used most widely among dyeing methods for pathological samples, and is practicable with ease at low cost.

By the objective optical system 102 and optical image forming system 104, light transmitted through the object O to be image captured forms an image on a capturing plane of an image capturing device not shown but included in the camera 105. Further, one of the optical filters 103 is located on any light path from the illumination 101 to the capturing plane of the camera 105, the optical filters 103 each having a diameter greater than at least a diameter of a light beam at the location. At this time, the optical filters 103 have a replaceable structure, and the number of optical filters 103 is two in the present embodiment. Based on this structure, replacement of the optical filters 103 and capturing of an image are carried out sequentially or in parallel, to capture multi-band images. In the present embodiment, two-band images are obtained for each pixel. Multi-band (two-band) images thus obtained are stored into the memory 106.

In the structure shown in FIG. 1, one of the replaceable optical filters 103 is located between the objective optical system 102 and the optical image forming system 104. Another structure is disclosed, for example, in U.S. Pat. No. 5,717,605 in which replaceable optical filters 103 and a camera 105 are integrated together and the filters are replaced by a turret.

Figure 4:
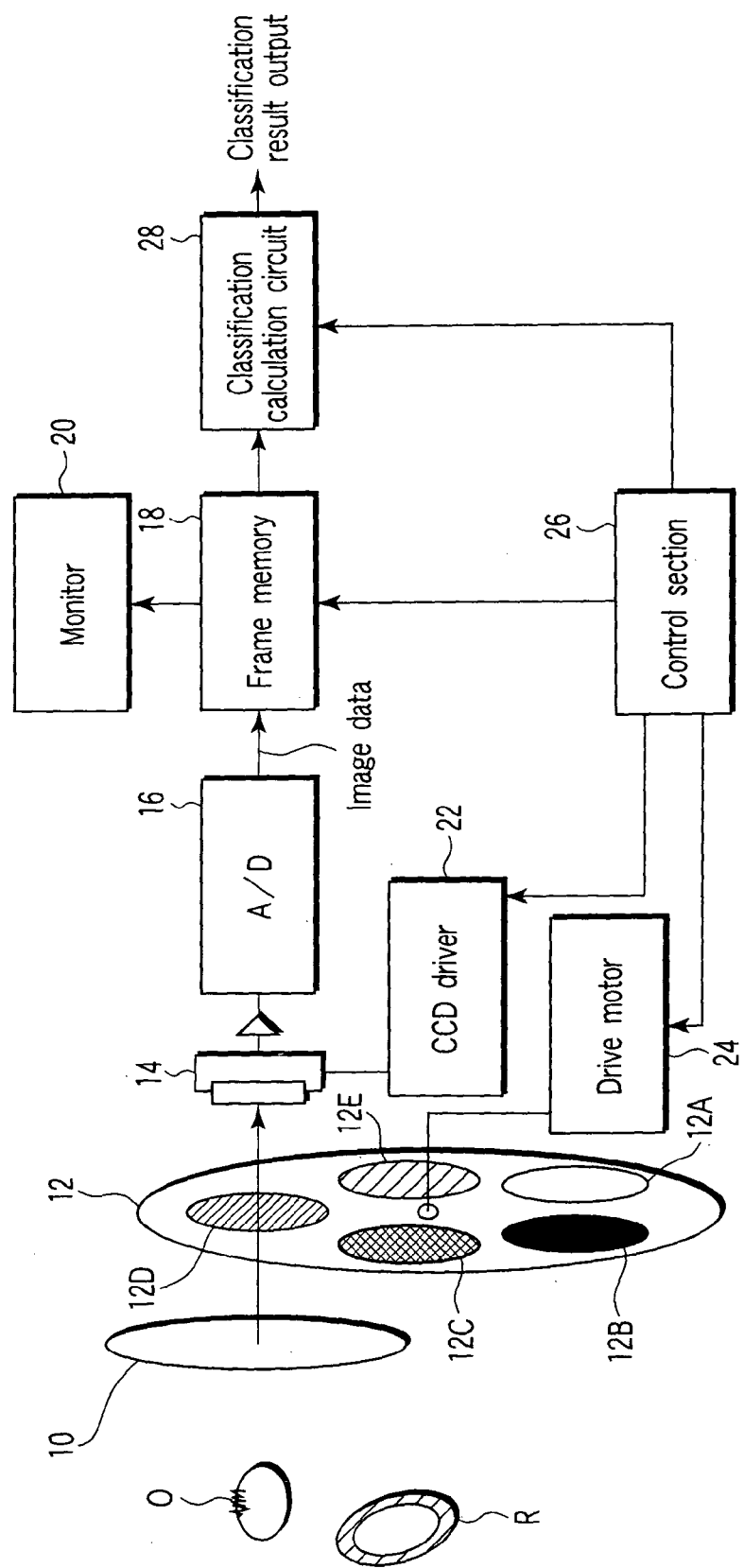
FIG. 4 shows a structure of a conventional color classification apparatus as an example of an image capturing apparatus for a multi-band image.
Figure 5A:
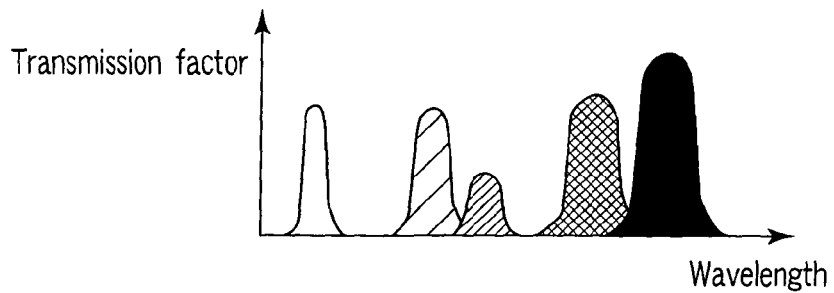
FIG. 5A shows characteristics of plural bandpass filters used for a rotary color filter used in the color classification apparatus shown in FIG. 4.
Figure 5B:
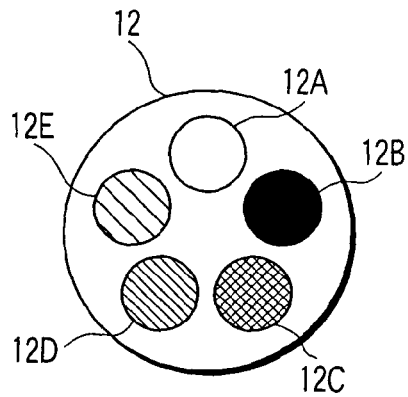
FIG. 5B shows a structure of the rotary color filter.
Figure 5C:
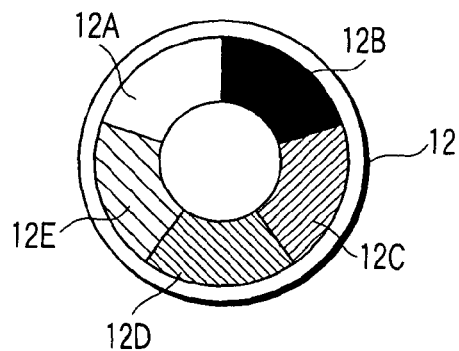
FIG. 5C shows another structure of the rotary color filter.

Specifically, as shown in FIG. 4, the color classification apparatus disclosed in the U.S. patent is constituted by: an optical system 10 including a diaphragm, lens, and the like; a rotary color filter 12 including plural bandpass filters 12A, 12B, . . . , 12E as shown in FIG. 5B; a CCD 14 for capturing images of a target object O and a reference plate R; an A/D converter 16; a frame memory 18; a monitor 20 which displays a part being captured; a CCD driver 22; a drive motor 24 for the rotary color filter 12; a control section 26 which controls the CCD driver 22, the rotary color filter drive motor 24, and the like and sends commands to a classification calculation circuit 28; and the classification calculation circuit 28. The rotary color filter 12 is constituted by plural kinds of band pass filters 12A to 12E, as shown in FIG. 5B or 5C. These filters respectively have characteristics of allowing given bandwidths to pass, as shown in FIG. 5A. In this figure, the rotary color filter 12 is constituted by five bandpass filters. There is description saying that the positions of the optical system 10 and the rotary color filter 12 may be reversed; e.g., the rotary color filter 12 may be located in front of the optical system 10.

Thus, the U.S. patent noted above merely discloses a color classification apparatus. However, the structure of replacement of the filter is applicable to the present embodiment. The present embodiment does not need five filters but needs only two filters.

Figure 6:
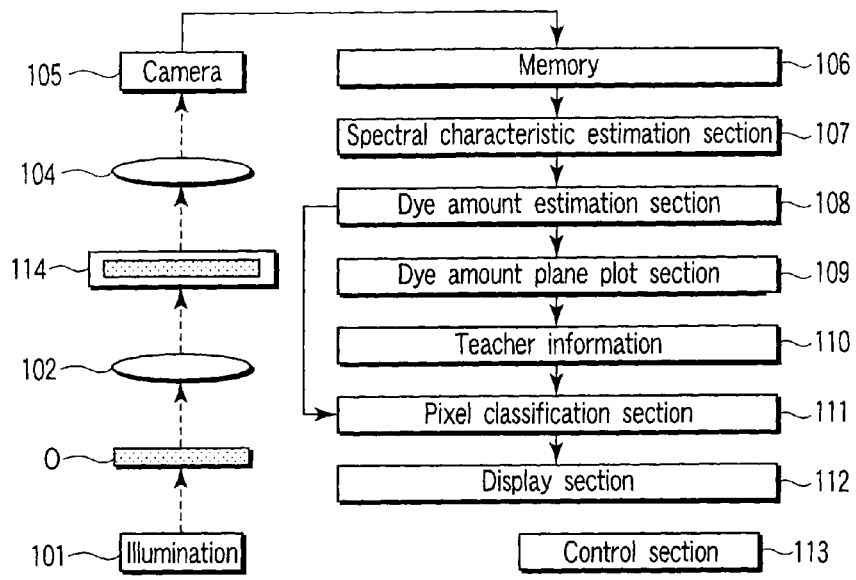
FIG. 6 shows a modification of the image processing apparatus.
Figure 7:
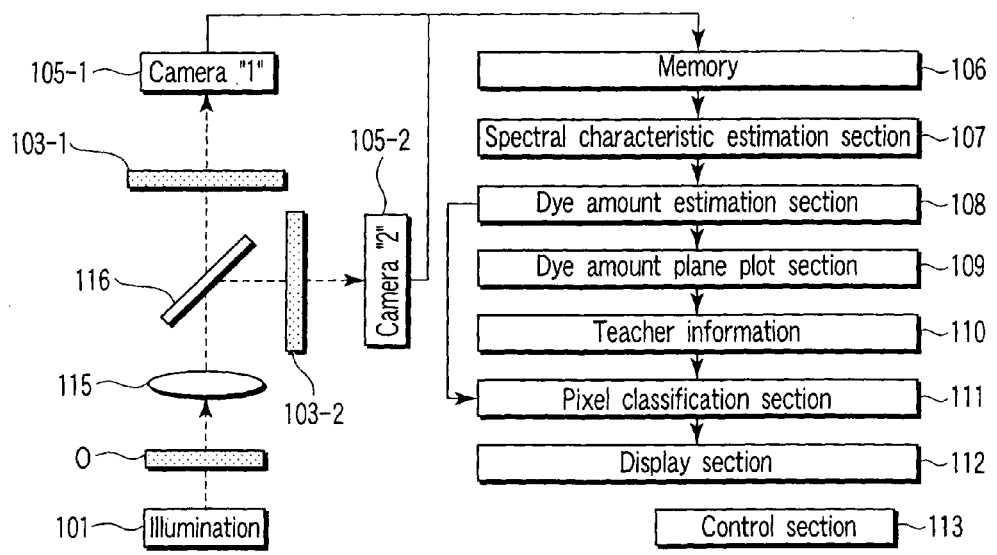
FIG. 7 shows another modification of the image processing apparatus.

In addition, in place of replacing physically different optical filters 103 for use, a transmissive wavelength variable optical filter 114 may be used as shown in FIG. 6. Alternatively, as shown in FIG. 7, a half mirror 116 or the like may be used in a rear stage of the optical system 115, to split a light path in accordance with the number of the optical filters so that capturing is carried out simultaneously by cameras 105 (a camera "1" 105-1 and a camera "2" 105-2) corresponding in number to the optical filters 103 (an optical filter "1" 103-1 and an optical filter "2" 103-2).

Concerning the optical filters 103 and the camera 105, multi-band images of an object can be obtained by use of any structure. However, the position of the image of the object on the image capturing plane of the image capturing device in the camera 105 has to stand still throughout the period of capturing the images.

Multi-band images are thus stored in the memory 106. Next, a spectral transmission factor of the object is obtained for each of pixels from the multi-band images by the spectral characteristic estimation section 107. In this processing, a method disclosed in "Spectral reflectance estimation from multi-band image using color chart" (Murakami et al., Optics Communications 188 [2001] 47-54) is applied to observation of transmission through a translucent substance.

Specifically, according to the method disclosed in the document noted above, spectral transmission factors of the optical filters 103, a spectral characteristic of the illumination 101, a spectral sensitivity of the camera 105, a correlation matrix of a spectral transmission factor of the object O, and a correlation matrix of capturing noise are used to be able to estimate a spectral transmission factor $\hat{f}(x,y)$ of the object O by Wiener estimation, from pixel values g(x, y) captured at a position (x, y) by use of a correlation matrix of capturing noise.

The spectral transmission factors of the optical filters 103, the spectral characteristic of the illumination 101, and the spectral sensitivity of the camera 105 need to be arranged to have an equal wavelength range, an equal wavelength sampling pitch, and an equal number of wavelength samples. The wavelength range, wavelength sampling pitch, and number of wavelength samples are taken over as the wavelength range, wavelength sampling pitch, and number of wavelength samples in a Wiener estimation result. Therefore, estimation can be achieved at an arbitrary resolution by controlling data given as spectral characteristics.

In the present embodiment, the wavelength range is a visible light region, and the number of wavelength samples is set to at least 3 or more.

Each pixel of the multi-band image is expressed as g(x, y), and estimation processing is executed while moving this. Then, a spectral transmission factor of the object O can be obtained with respect to every pixel subjected to multi-band image capturing.

When calculating a Wiener estimation matrix, the spectral transmission factor of the object O is used. Therefore, an estimation value to be obtained is a spectral transmission factor. There is no need for processing for normalizing this estimation value with characteristics of the illumination 101.

In the Wiener estimation, noise characteristics of image capturing devices are incorporated into conditions. Therefore, an estimation result optimal from viewpoints including SN ratio can be obtained.

A spectral image of an object may be directly obtained in place of means specified above. This kind of apparatus for obtaining a spectral image is disclosed in U.S. Pat. No. 5,784,162.

Next, the dye amount estimation section 108 obtains a dye amount of the object O for each pixel, from the estimation result of the spectral transmission factor from the spectral characteristic estimation section 107. This processing uses a method disclosed in "Analysis of Tissue Samples Using Transmittance Spectra—The Method Of Considering the differences of dyeing conditions" (Fujii et al., the 3rd Symposium of the 'Color' of Digital Capturing in Biomedicine).

Specifically, according to the method disclosed in the document noted above, spectral transmission factors of hematoxylin and eosin can be used to estimate a two-dimensional distribution $ch(x, y)$ of a hematoxylin dye amount and a two-dimensional distribution $ce(x, y)$ of an eosin dye amount from a two-dimensional distribution $I(\lambda, x, y)$ of the spectral transmission factor of the object O at a position $(x, y)$ obtained by the spectral characteristic estimation section 107, by application of a Lambert-Beer law.

After dyeing with hematoxylin and eosin, most of the hematoxylin dye exists inside nuclei. Therefore, the hematoxylin dye amount distribution $ch(x, y)$ can be regarded as a distribution of nuclei. Meanwhile, most of the eosin dye exists inside of cytoplasms. Therefore, the eosin dye amount distribution $ce(x, y)$ can be regarded as a distribution of cytoplasms.

With at least two optical filters 103 used in the processing noted above, dye amounts can be estimated because two is the number of independent components which decide the spectral transmission factor of the object O to be captured, i.e., the number of dyes. Further, spectral characteristics can be selected so as to minimize errors of dye amounts estimated. This is achieved, for example, by preparing plural bandpass filters respectively having different center wavelengths and different half-widths and by searching for a combination which minimizes errors in estimation of dye amounts.

Since noise characteristics of image capturing device are used when performing the Wiener estimation, spectral characteristics of the object O obtained as a result of the Wiener estimation and further a dye amount obtained based on the spectral characteristics of the object O include a condition concerning the noise characteristics of the image capturing device, as a matter of course. Therefore, selection of optimal filters as described above reflects the condition concerning the noise characteristics of the image capturing device in addition to a condition of minimizing errors of dye amounts.

Figure 3B:
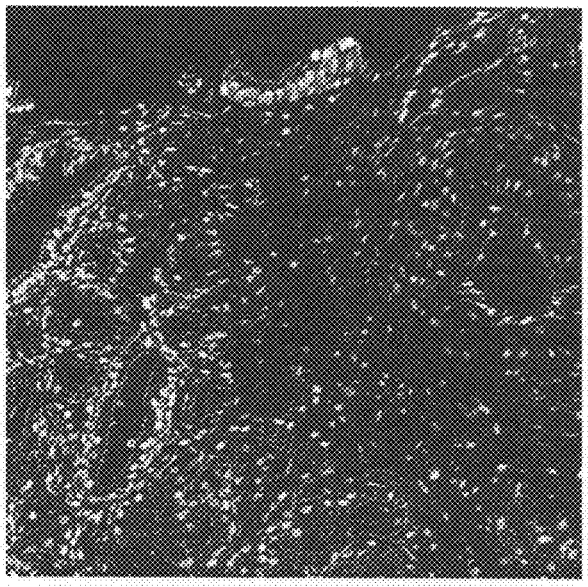
FIG. 3B shows an image of an estimated dye amount distribution of a hematoxylin dye.
Figure 3C:
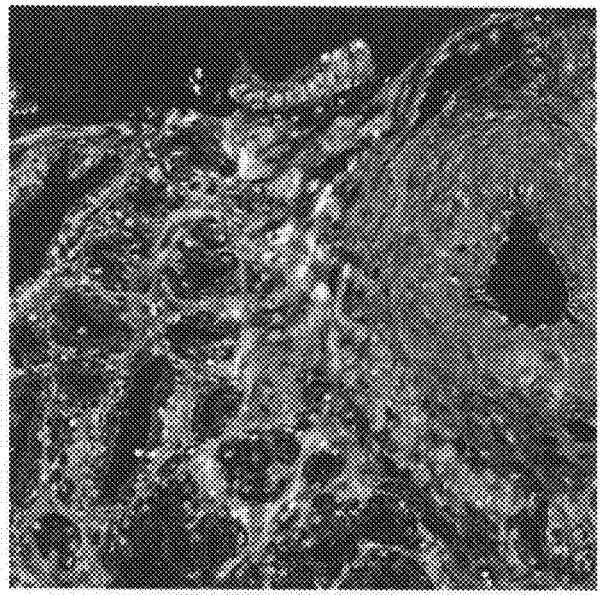
FIG. 3C shows an image of an estimated dye amount distribution of an eosin dye.

Through processing up to this stage, multi-band images of a pathological sample can be captured, a spectral transmission factor can be obtained for each pixel, and amounts of hematoxylin and eosin dyes can be obtained quantitatively, independently, and two-dimensionally, as shown in FIGS. 3B and 3C.

Figure 8:
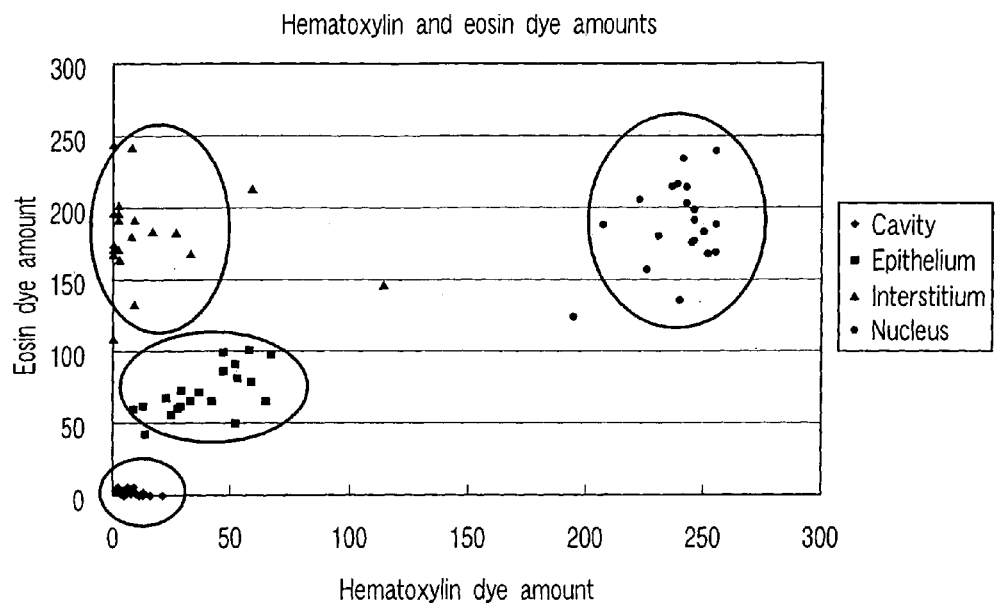
FIG. 8 is an graph explaining cluster structures on a hematoxylin-eosin dye amount plane.

Next, by the dye amount plane plot section 109, dye amounts of hematoxylin and eosin at an arbitrary point of the object to be imaged are read from distributions of dye amounts which have been estimated by the dye amount estimation section 108. In accordance with a combination of values thereof, the dye amounts are plotted onto a plane (hereinafter called a hematoxylin-eosin dye amount plane) having dye amounts of hematoxylin and eosin as axes. If the dye amounts are thus plotted onto the hematoxylin-eosin dye amount plane, the plotted position thereof changes on the hematoxylin-eosin dye amount plane in correspondence with the type of tissue to which the remarked point belongs, as shown in FIG. 8. That is, points which belong to one identical tissue type are relatively close to one another. Points which respectively belong to different tissue types are relatively distant from one another. As a result, cluster structures are formed. Hence, if this nature is utilized, each pixel of the object O to be captured can be classified using the quantitative values of dye amounts which have been estimated by the dye amount estimation section 108.

In the present embodiment, pixels of a pathological sample are classified into three types, i.e., nuclei, epithelia, and interstitia. Portion (cavity) which includes no tissue are added to the three types. Every pixel is classified into one of the four classes. It is now important that pixels of a pathological sample are classified into three types, i.e., nuclei, epithelia, and interstitia while there are two types of orthochromatic dyes, i.e., hematoxylin and eosin. That is, pixels are classified into a greater number of classes than the number of dye types.

Further, the pixel classification section 111 actually executes processing for classifying each pixel. At this time, however, boundaries between clusters on the hematoxylin-eosin dye amount plane need to be decided prior to the classification processing, by using total four or more samples which include at least one sample for each class, as teacher information 110 having clear contents.

Figure 3D:
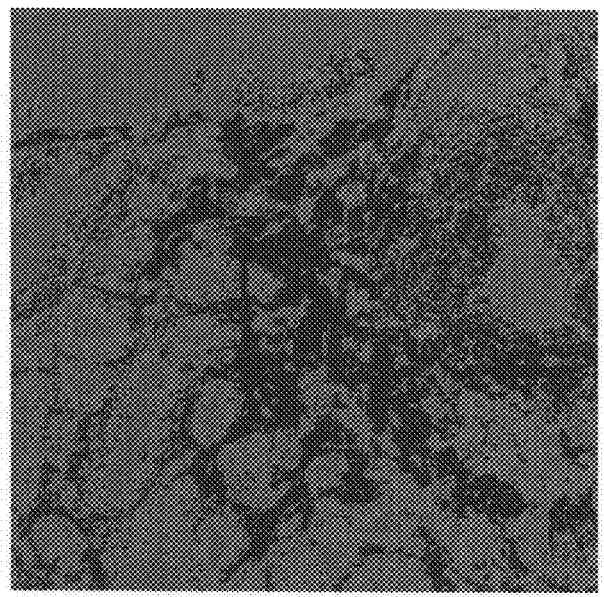
FIG. 3D shows an image of a result of pixel classification.

In addition, when a pathological sample having unknown contents is given as an object O, the dye amount estimation section 108 decides firstly a dye amount distribution in accordance with each of the processing described above. Thereafter, the pixel classification section 111 classifies each pixel of the unknown sample in accordance with cluster information of the teacher information 110. For this classification, a generally used nearest neighbor decision method (NN method) or a k-nearest neighbor decision method (k-NN method) as an improvement thereof can be used. Thus, pixels of the unknown sample are classified into one of the four classes. The classes are arranged in order corresponding to order of original pixels. Then, as shown in FIG. 3D, a classification result is obtained as an image.

This image can be used as an input to other processing and can be displayed on the display section 112 if necessary.

Alternatively, points plotted onto the hematoxylin-eosin dye amount plane can be subjected to clustering without using teacher information. Useful information for analyses of an unknown sample, such as a distribution, positions, and dispersion of clusters can then be obtained.

Figure 9:
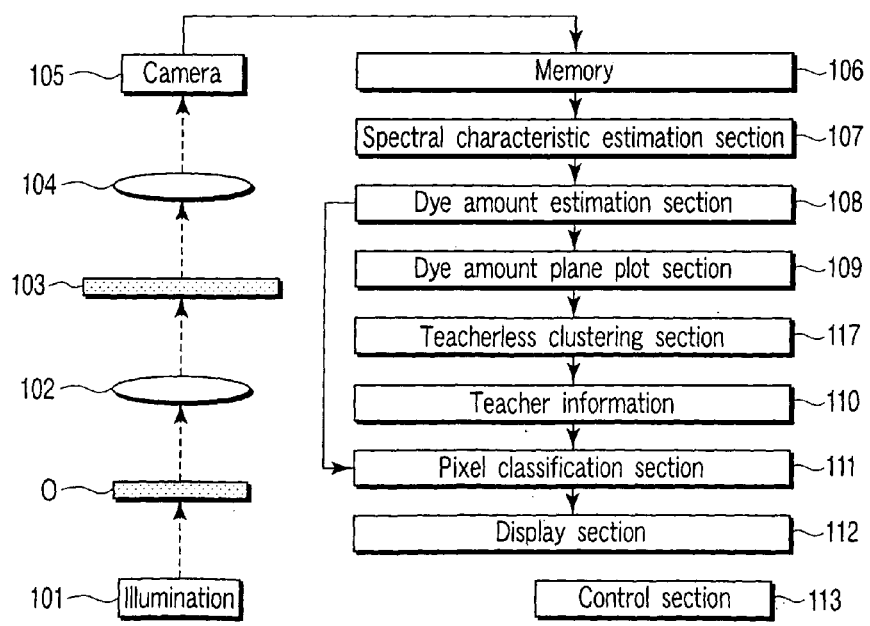
FIG. 9 shows yet another modification of the image processing apparatus.

Further, as shown in FIG. 9, a teacherless clustering section 117 can perform teacherless clustering on an unknown sample, and a result thereof can be used as the teacher information 110 for classification of pixels as described above. Then, pixels can be classified without requiring teacher information from outside. A known example of a clustering method using no teacher information is an LBG algorithm, and is disclosed in "Audio Coding", pp. 50 to 51 (Takehiro Moriya, The Institute of Electronics, Information and Communication Engineers, 1998, ISBN4-88552-156-4).

According to the processing as described above, multi-band images of a pathological sample can be captured, dye amount distributions of hematoxylin and eosin can be obtained, and further, based on quantitative values thereof, an arbitrary pixel in the image can be classified into a greater number of classes than the number of types of dyes. Respective classes correspond to types of tissues constituting the sample, and classification into nuclei, epithelia, and interstitia is possible. If the classes are further subdivided, classification is possible into more various types of tissues without increasing the number of dyes. Accordingly, regions which include particular types of tissues corresponding to those classes can be extracted.

In addition, classification of tissues in the present embodiment requires no morphological analysis but is carried out only based on pixel values of a multi-band image. Therefore, processing can be performed for each pixel and independently from a morphological analysis which is complex and requires high calculation costs.

As described above, the present invention has been described on the basis of an embodiment thereof. However, the present invention is not limited to the embodiment described above but various modifications and applications are naturally available within the scope of the subject mater of the present invention.

For example, although the above embodiment uses a biopsy sample (pathological sample) as an object O to be captured, the present method is applicable actually as long as the object is a colored light transmissive object.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image processing apparatus comprising:
   a dye amount distribution obtaining section configured to obtain a distribution of dye amounts from a sample colored with at least one dye; and
   a classification section configured to classify a point on the sample in accordance with a dye amount at a corresponding position on the distribution obtained by the dye amount distribution obtaining section,
   wherein when the sample is colored with N types of dyes, the dye amount distribution obtaining section obtains the distribution of dye amounts of the N types of dyes, and the classification section classifies the point on the sample into an N-dimensional space.

2. The image processing apparatus according to claim 1, wherein M expressing a number of teacher information items which the classification section uses for classification is greater than N.

3. The image processing apparatus according to claim 1, wherein the dye amount distribution obtaining section includes an image capturing section configured to perform multi-band image capturing of the sample by use of optical filters.

4. The image processing apparatus according to claim 3, wherein a number of the optical filters which the image capturing section uses for the capturing is equal to a number of types of dyes with which the sample is colored.

5. The image processing apparatus according to claim 1, wherein the sample is a biopsy sample.

6. The image processing apparatus according to claim 5, wherein the biopsy sample is a pathological tissue sample.

7. The image processing apparatus according to claim 6, wherein the at least one dye comprises hematoxylin and eosin.

8. The image processing apparatus according to claim 1, wherein the classification section visualizes a result of the classification as an image.

9. The image processing apparatus according to claim 8, further comprising a display section configured to display a result of the classification visualized as an image.

* * * * *